G. R. RADLEY.
PROTECTION FOR ELECTRIC METERS.
APPLICATION FILED NOV. 8, 1905.
920,649.
Patented May 4, 1909.
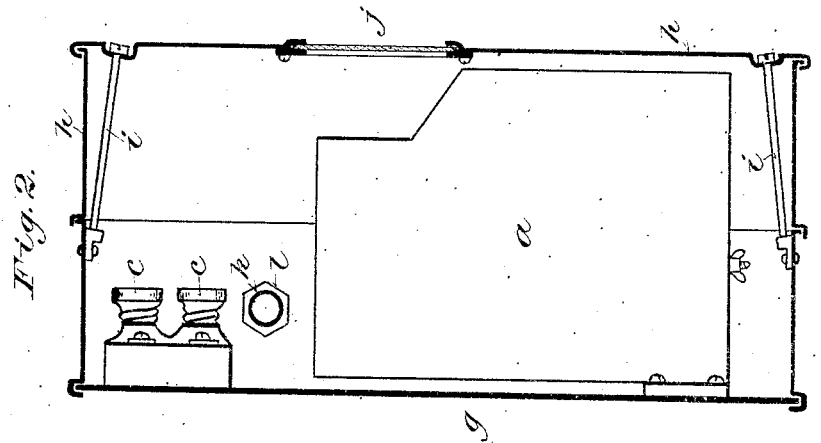
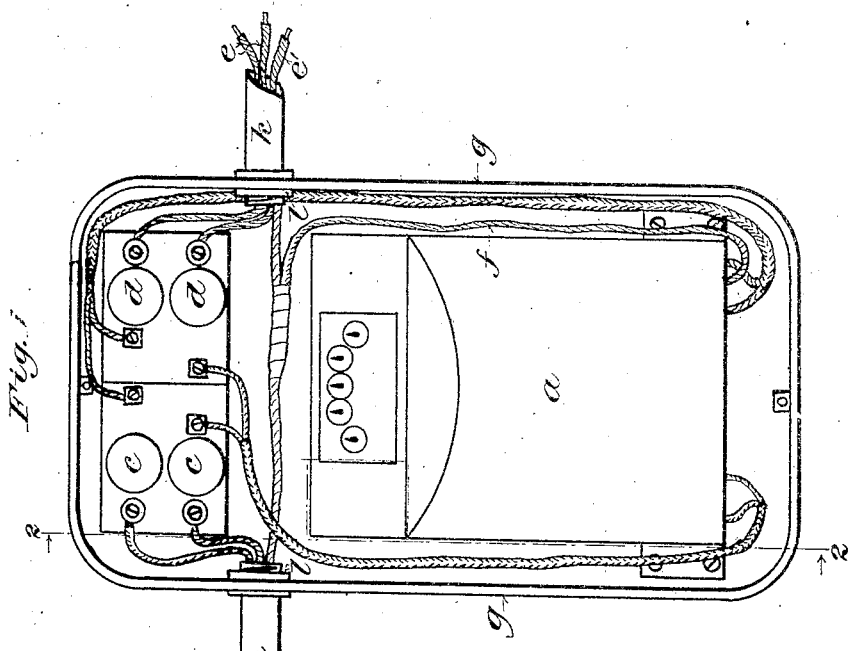
Witnesses:
Inventor:
Guy R. Radley,
By Whittemore, Hulbert, Smith, Whittemore & Hulbert
Attorneys.

UNITED STATES PATENT OFFICE.

GUY R. RADLEY, OF MILWAUKEE, WISCONSIN.

PROTECTION FOR ELECTRIC METERS.

No. 920,649.

Specification of Letters Patent.

Patented May 4, 1909.

Application filed November 8, 1905. Serial No. 286,345.

*To all whom it may concern:*

Be it known that I, GUY R. RADLEY, a citizen of the United States, residing at Milwaukee, in the county of Milwaukee and State of Wisconsin, have invented certain new and useful Improvements in Protection for Electric Meters, of which the following is a specification, reference being had to the accompanying drawing, forming a part thereof.

The main object of this invention is to avoid errors resulting from accidental or intentional interruption of or interference with the operation of electric meters.

It consists in certain novel features of construction and in the peculiar arrangement of parts as hereinafter particularly described and pointed out in the claims.

In the accompanying drawing like letters designate the same parts in both figures.

Figure 1 is a front elevation of a three-wire meter and its connections, provided with a protective inclosure embodying the invention, the front or cover of the protective box or case being removed; and Fig. 2 is a vertical section on the line 2, 2, Fig. 1 of the box or case, including the cover but omitting the wiring.

In the commercial measurement of electricity with meters as now constructed, it is found that errors frequently occur due to certain causes external to the meter itself. These causes, whether purely accidental or the result of a premeditated plan to defraud, may be mechanical, electrical or magnetic in nature, as indicated in the following list:

1. Mechanical interference may be occasioned.

(a) By drilling a hole in the cover or base of the meter and inserting a wire far enough to touch and stop or retard the moving element of the meter.

(b) By inserting a wire between the cover and base or through the regular wire hole alongside of the conductor therein in such a way as to touch and stop or retard the moving part of the meter.

(c) By removing or loosening the supporting screws or other fastenings and tipping the meter so as to stop or retard it.

(d) By cracking the jewel, which may be accomplished by a sharp blow on the base, thus causing the meter to run slow on large loads and to entirely fail to register small ones.

(e) By allowing water or acids to fall on meter, the usual felt packing strip permitting its entrance into the meter with resulting damage by electrolysis.

2. Electrical interference may be occasioned, (a) By tapping the service wires on one side of the meter and connecting them with the wires on the other side, a concealed switch in this shunt making it possible to defraud whenever desired.

(b) By forcibly pulling certain of the wires out of the binding posts, thus stopping the meter, and then inserting such wires again when the inspector is expected.

(c) By breaking the neutral tap. (Repeated bending may cause a copper wire to break inside of its insulating covering. The meter will then register only when the ends happen to touch each other.)

(d) By removing the service fuse in an outside wire of a three-wire meter whose potential circuit is connected from such outside wire to the neutral wire, thus stopping the meter, it being then possible to use half the full load through the other fuse without registration.

(e) In the case cited in paragraph d, by running a "jumper" from the dead wire to the other outside wire, thus permitting the whole load to be used while the meter registers the difference of load between the two sides of the system instead of the sum.

(f) And in case the service fuse be concealed or inaccessible, the fuse on the potential side may be blown by purposely making a ground or short-circuit on that side with the same result as stated in paragraph d.

3. The meter may be interfered with magnetically.

(a) By placing a strong, permanent magnet in proximity to the meter, the stray field thus created being capable of considerably reducing the registration.

(b) By bringing an electro-magnet excited with alternating current near the meter, thereby demagnetizing the drag magnet and causing the meter to run too fast, which gives a customer occasion to claim a rebate on past bills.

The invention consists broadly in inclosing an electric meter and its connections in a protective case and conduit whereby they are made inaccessible, and interruption of and interference with the normal and proper operation of the meter by the above enumerated causes are prevented.

Referring to the drawing, $a$ designates a three-wire electric meter of a well known type containing field coils, an armature or rotating element, and a drag or brake magnet, which are not shown and need not be described since their nature and operation are well understood by those familiar with the art to which this invention pertains.

$b$ designates the service or supply wires leading to service or supply cut-outs $c$, which are provided as usual with inclosed fuses of a rating at least double the safe carrying capacity of the meter. From these cut-outs the service or supply wires lead, as shown in Fig. 1, to the field coils of the meter, thence back to cut-outs $d$ which are also provided with inclosed fuses but of a rating only slightly in excess of the rated capacity of the meter. From the cut-outs $d$ lead the outside wires $e$ of the utilization or working circuit. The reason for the two sets of fuses above mentioned is that any over-load or short-circuit on the utilization or working circuit will blow or melt only the smaller fuses, leaving potential on the meter armature, and only in case of a breakdown of the insulation of the meter itself are the larger fuses required to prevent total destruction of or serious injury to the meter which would occur if no fuses were provided between the supply mains and the meter.

A tap $f$ to supply potential to the armature of the meter is taken off from the neutral wire which is designated $b'$ $e'$, and passes directly from the service or supply to the utilization or working circuit without the interposition of a fuse or cut-out. The meter and connections thus briefly described are such as are commonly used in a three-wire direct current system, and of themselves do not constitute the present invention.

The meter $a$ with the cut-outs $c$ and $d$ and their connections with each other and with the wires of the service and utilization circuits, are inclosed in and protected by a metallic box or case $g$ against premeditated or accidental meddling or interference. This box, which is provided with a removable cover $h$, as shown in Fig. 2, may be conveniently made of pressed steel, and in any case is preferably made of magnetic metal to prevent interference with the operation of the meter by bringing a magnet in proximity thereto, as hereinbefore stated. The cover $h$ may be permanently locked or secured to the base or body of the box, so as to prevent unauthorized access to the meter, by any suitable means, such for example as screws $i$, the heads of which are countersunk in the cover, as shown in Fig. 2, and are sealed with wax, plaster of paris, or other suitable material.

A glazed opening $j$ is provided in the cover for reading the meter without opening the protective box or case.

The service or supply wires $b$ $b'$ leading to the meter, and the wires $e$ $e'$ of the utilization or working circuit leading from the meter, are inclosed in and protected by iron pipes or tubular conduits $k$ which are secured at the ends in the base or body of the protective box or case $g$ by lock nuts $l$ or other fastenings which are inaccessible from the outside when the box or case is closed, and which prevent detachment and removal of the pipes from the box unless the box is opened. These pipes or conduits extend a sufficient distance from the meter to prevent tapping or interference therewith or unauthorized connections being made in any of the ways hereinbefore mentioned.

In new buildings the base or body of the box $g$ is preferably let into and permanently secured in a wall by the workmen who install the piping or wire conduits which are secured in the box or case as above explained. When the meter is installed in an old building the box may be fastened to a wall or other support by screws passing through the back, or by other fastenings which are inaccessible from the outside when the box is closed.

Various changes in minor details of construction and in the arrangement of parts may be made without departing from the principle and intended scope of the invention.

I claim:

1. The combination with an electric meter and wires leading thereto and therefrom on the service and the utilization sides respectively, of fuses disposed on the service and the utilization sides of the meter, the fuse in circuit after the meter being of such a capacity as to be blown before the fuse on the service side, and a metallic case inclosing said fuses and preventing unauthorized access thereto, substantially as described.

2. The combination with an electric meter and wires leading thereto and therefrom on the service and the utilization sides respectively, of fuses disposed on the service and the utilization sides of the meter, the fuse in circuit after the meter being of such capacity as to be blown before the fuse on the service side, a metallic case inclosing said meter and fuses and protecting the same against unauthorized interference, substantially as described.

3. The combination with an electric meter and wires leading thereto and therefrom on the service and the utilization sides respectively, of fuses disposed on the service and the utilization sides of the meter, the fuse in circuit after the meter being of such capacity as to be blown before the fuse on the service side, a metallic case inclosing said fuses, a tubular metallic conduit inclosing the wire leading to the fuse on the service side of the meter and a fastening securing said conduit within the case and inaccessible from the outside when the case is closed, substantially as described.

In witness whereof I hereto affix my signature in presence of two witnesses.

GUY R. RADLEY

Witnesses:
 CHAS. L. GOSS,
 BERNARD C. ROLOFF